United States Patent Office 3,380,956
Patented Apr. 30, 1968

3,380,956
STABILIZED VINYL HALIDE RESIN
COMPOSITIONS
Arthur F. Fletcher, Elizabeth, and James P. Scullin,
Pompton Lakes, N.J., assignors to Tenneco Chemicals,
Inc., a corporation of Delaware
No Drawing. Continuation-in-part of application Ser. No.
307,004, Sept. 6, 1963. This application July 24, 1964,
Ser. No. 385,060
6 Claims. (Cl. 260—41)

ABSTRACT OF THE DISCLOSURE

Resinous compositions that contain a vinyl halide, asbestos, and a stabilizer system comprising a nitrogen-containing compound, such as melamine, dicyandiamide, or benzoguanamine, and 0.1 part to 3 parts of dodecenylsuccinic anhydride per part of the nitrogen-containing compound are characterized by excellent dimensional stability as well as by very light color, by good color retention, and by excellent heat and light stability. Further improvement in the initial color and the color retention of the vinyl halide resin compositions can be brought about by incorporating in the stabilizer 0.3 part to 2 parts by weight per part of the nitrogen-containing compound of a polyhydric alcohol having at least four hydroxyl groups.

---

This invention relates to stabilizers for halogen-containing resins and to the resinous compositions stabilized therewith.

A rapidly expanding industry utilizing vinyl halide resins has created a need for stabilizers that will render the finished articles of manufacture more useful, more versatile in application, and more nearly permanent. During their fabrication into plastic sheets, rigid bodies, and the like, for example, vinyl halide resins are ordinarily subjected to elevated temperatures. The resins so treated tend to decompose somewhat as is evidenced by their development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as the subsequent prolonged heating of the finished products.

In addition to having good heat and light stability, it is desirable that the vinyl halide resin compositions be light in color, that they retain their light color when heated, and that they have good dimensional stability.

It is known that the addition of certain compounds that have in their structural formulas the group

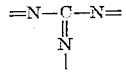

to asbestos-filled vinyl halide resin compositions results in products that are characterized by excellent resistance to thermal degradation. While such compositions are relatively light in color, it is necessary for some applications, such as the preparation of white or light-colored floor coverings, that their color be lightened and their color retention improved.

In our copending patent application, Ser. No. 307,004, which was filed on Sept. 6, 1963, of which this application is a continuation-in-part, it is shown that the use of such polycarboxylic acid anhydrides as phthalic anhydride, maleic anhydride, or succinic anhydride alone or in combination with a polyhydric alcohol in asbestos-filled vinyl halide resin compositions that contain as stabilizer one of the aforementioned nitrogen-containing compounds results in products that are very light in color, that have good color retention, and that have excellent heat and light stability.

While the presence of polycarboxylic acid anhydrides in vinyl halide resin compositions improves their color and color retention, it has been found that when the aforementioned polycarboxylic acid anhydrides are used, the products often do not have the dimensional stability that is required of materials that are to be used in the manufacture of flooring tiles or sheet goods; that is, floor covering materials made from compositions containing phthalic anhydride, maleic anhydride, or succinic anhydride as a stabilizer component tend to increase in size when they are in contact with water for prolonged periods of time.

It has now been found that when dodecenylsuccinic anhydride is the polycarboxylic acid anhydride that is used in combination with a nitrogen-containing compound having in its structural formula the group

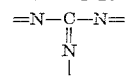

to stabilize asbestos-filled vinyl halide resin compositions, the resulting products are characterized by excellent dimensional stability as well as by very light color, by good color retention, and by excellent heat and light stability. These compositions therefore give excellent results when they are used in the manufacture of flooring tiles and sheet goods.

The nitrogen-containing compounds that may be used in the stabilizers of this invention are those that have in their structural formulas the group

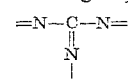

This group may form a portion of an s-triazine ring. In this case the compounds have the formula

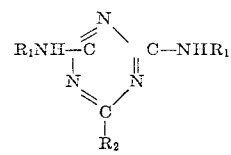

in which $R_1$ in each case represents a hydrogen atom, a phenyl group, an alkyl group having 1 to 5 carbon atoms, or a carbon atom in an s-triazine ring and $R_2$ represents an amino group, a substituted amino group such as an alkylamino or a phenylamino group, or a phenyl group. Alternatively, the nitrogen-containing compound may be an acylic compound having the formula

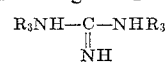

in which $R_3$ represents a hydrogen atom, a phenyl group, a cyano group, or an alkyl group having from 1 to 5 carbon atoms. Illustrative of the nitrogen-containing compounds that may be used in the practice of this invention are melamine, lower alkyl melamines, such as methylmelamines and propylmelamines, phenylmelamines, melam, melem, benzoguanamine, guanidine, dicyandiamide, and melaniline. Salts of the aforementioned compounds, such as the carbonate, hydrochloride, and sulfate salts, may also be used. A single nitrogen-containing compound or two or more of these compounds may be present in the stabilized vinyl halide compositions. Because they form compositions having the lightest colors and the best color retention, melamine, dicyandiamide, benzoguanamine, and mixtures thereof are the preferred nitrogen-containing compounds.

The stabilizer of the present invention generally contains approximately 0.1 part to 3 parts, and preferably 0.3 part to 1 part, by weight of the nitrogen-containing compound.

Further improvement in the initial color and the color retention of the vinyl halide resin composition may often be brought about by using a polyhydric alcohol having four or more hydroxyl groups in combination with the nitrogen-containing compound and dodecenylsuccinic anhydride. Among the polyhydric alcohols that may be used are pentaerythritol, dipentaerythritol, sorbitol, mannitol, and methyl glucoside. Also useful are the polymeric alcohols that have the formula

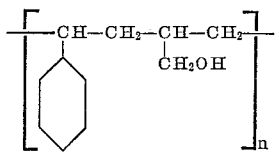

wherein $n$ represents a number in the range of 5 to 10. One such polymeric alcohol, which has a molecular weight of approximately 1150, is marketed as Resinous Polyol X–450 by Shell Chemical Co. The amount of polyhydric alcohol that is used can be varied within wide limits with approximately 0.3 part to 2 parts by weight of the polyhydric alcohol ordinarily used per part by weight of the nitrogen-containing compound.

Only a small amount of the novel stabilizer need be present in the vinyl halide compositions of the present invention. It has been found that as little as 0.5 part by weight of the stabilizer per 100 parts by weight of the vinyl halide resin will bring about an appreciable improvement in the heat and light stability of the composition. Approximately 10 parts by weight or more of the stabilizer can be used, but these larger amounts generally do not provide further improvement in the properties of the resinous composition and for this reason are not ordinarily used. While the amount of the stabilizer that will provide optimum heat and light stability depends upon such factors as the choice of stabilizer components and the choice of vinyl halide resin, in most cases approximately 1 part to 5 parts by weight of the stabilizer per 100 parts by weight of the vinyl halide resin is used.

The vinyl halide polymers that may be employed in the compositions of this invention are the resinous products obtained by the polymerization of a vinyl halide in the presence or the absence of another polymerizable compound. The term "vinyl halide resin" as herein employed includes vinyl halide homopolymers, such as polyvinyl chloride and polyvinyl bromide, as well as copolymers, such as those formed by the reaction of a vinyl halide with at least one other polymerizable monoolefin, such as vinyl acetate, vinyl propionate, vinyl butyrate, vinylidene chloride, styrene, methyl methacrylate, dialkyl fumarate or maleate, and the like. The vinyl halide used is ordinarily and preferably the chloride, although the bromide and the fluoride may also be used. The copolymers that may be used in the practice of this invention are those prepared from at least 70% of the vinyl halide and up to 30% of the other polymerizable monoolefinic compound.

While the stabilizers of the present invention may be used in vinyl halide resins containing a wide variety of inorganic fillers, they are of particular value in asbestos-filled vinyl halide compositions, such as those that are used in the preparation of floor coverings. Included among the inorganic fillers that may be present in the compositions of this invention are both fibrous and non-fibrous fillers. While either type of filler may be used as the sole inorganic filler, the compositions generally contain both fibrous and non-fibrous fillers.

The fibrous fillers that may be present in the novel vinyl halide resin compositions include asbestos and the mineral wools. Asbestos is the most commonly used and the preferred fibrous filler. It is usually present in the amount of approximately 50 parts to 200 parts and preferably 80 parts to 150 parts per 100 parts by weight of the vinyl halide resin. Any of the commercially available grades of asbestos that are used in the preparation of floor covering compositions may be used in the practice of this invention.

Suitable non-fibrous inorganic fillers include the many materials that are commonly employed as fillers by the plastics industry. Illustrative of these are calcium carbonate, calcium sulfate, calcium silicate, barium carbonate, barium sulfate, silica, china clay, kaolin, fullers earth, and magnesium silicate as well as such pigments as titanium dioxide, iron oxide, and lead chromate. The non-fibrous fillers are generally used in amounts ranging from 50 parts to 300 parts and preferably from 100 parts to 200 parts per 100 parts by weight of the vinyl halide resin. While a single non-fibrous filler may be used, a mixture of two or more of these fillers that includes at least one pigment is most often used.

Any of the usual plasticizers for vinyl halide resins may be employed in the compositions of this invention. These include, for example, di-2-ethylhexylphthalate, dibutyl sebacate, tricresyl phosphate, and the like. The amount of plasticizer used is generally in the range of approximately 5 parts to 100 parts per 100 parts by weight of the vinyl halide resin, with 15 parts to 50 parts preferred.

In addition to the aforementioned ingredients, the vinyl halide resin compositions may also contain one or more of the previously known heat and light stabilizers for vinyl halide resins. These include, for example, metal soaps, such as the barium, cadmium, and zinc salts of fatty acids, benzoic acid, or p-tertiary butylbenzoic acid; metal phenates, such as the barium, cadmium, and zinc salts of phenol or an alkylphenol; organic phosphites, such as triphenylphosphite, diphenyl octylphosphite, and isooctyl di-tert. octylphenyl phosphite; and epoxidized oils, such as epoxidized soybean oil and esters of epoxidized tall oil fatty acids. Extenders, resins, solvents, dyes, and the like may also be present in the amounts ordinarily employed for the purposes indicated.

The stabilizers of the present invention may be incorporated in the vinyl halide resin compositions by any convenient procedure. For example, the stabilizer components may be added individually to the vinyl halide resin composition, or a mixture of the stabilizer components optionally containing an inert diluent such as calcium carbonate or an organic solvent may be added. The vinyl halide resin, inorganic filler, stabilizer, and other ingredients may then be blended with or without the aid of a volatile solvent and the resulting composition milled on rolls at 200° F. to 350° F. until it is homogeneous. The stabilized resinous composition may then be removed from the mill in the form of a film or sheet of the desired thickness. It may be used as such or subjected to a polishing or embossing treatment.

The invention is further illustrated by the example that follows. It is to be understood, however, that this example is given solely for the purpose of illustration and that the invention is not to be regarded as being limited to any of the specific materials or conditions recited therein except as set forth in the appended claims. In the example, parts and percentages are by weight unless otherwise indicated.

Example

To a mixture of 115 parts of polyvinyl chloride, 150 parts of chrysotile asbestos, 414 parts of ground limestone, 51 parts of dioctyl phthalate, 6 parts of epoxidized soybean oil, and 7.5 parts of titanium dioxide was added the amount of stabilizer indicated in Table I. The mixture was blended at room temperature and then changed to a two-roll, steam-heated differential speed mill, whose roll surface temperature was maintained at 300° F. The mixture was milled for 5 minutes and then removed from the rolls as a homogeneous sheet, 0.090 inch in thickness. To determine their heat stability, 1 x 1 inch specimens of the compositions were placed in a forced-circulation air oven at 300° F., and specimens were removed periodically until considerable degradation had taken place as indicated by color change. The length of time that the specimens were heated before substantial change in color occurred is given in Table I.

The dimensional stability of the compositions was determined by the following procedure: 9 x 9 inch tiles were die-cut from the 0.090 inch sheets of the compositions and then measured with a micrometer accurate to ±0.001 inch. The tiles were immersed in distilled water at 25° C. The linear dimensions of the tiles were measured periodically. The water growth values given in Table I are those measured in the direction perpendicular to the mill direction.

TABLE I

| Ex. No. | Stabilizer | PHR[1] | Initial Color | Heat Stability at 300° F. (minutes to color change) | Water Growth [increase (in mils) in length after immersion in water at 25° C.] | | | | | | |
|---|---|---|---|---|---|---|---|---|---|---|---|
| | | | | | 1 Day | 3 Days | 7 Days | 10 Days | 14 Days | 21 Days | 28 Days |
| A | Dodecenylsuccinic anhydride melamine. | 0.5 3.5 | Fair | >150 | 2 | 8 | 11 | 16 | 18 | 23 | 27 |
| B | do | 1 3 | Good | >150 | 3 | 8 | 10 | 14 | 17 | 22 | 25 |
| C | do | 1.5 2.5 | Excellent | >150 | 3 | 9 | 11 | 16 | 20 | 24 | 28 |
| D | do | 2 2 | do | >150 | 4 | 13 | 16 | 21 | 25 | 32 | 36 |
| E | do | 3 3 | do | >150 | 5 | 11 | 19 | 20 | 25 | 34 | 39 |
| F | Phthalic anhydride melamine. | 3 3 | do | >150 | 5 | 12 | 28 | 38 | 51 | 69 | 84 |
| G | Melamine | 4 | Poor | >150 | 3 | 9 | 13 | 18 | 22 | 26 | 28 |
| H | do | 6 | do | >150 | 2 | 7 | 12 | 16 | 23 | 27 | 30 |
| I | Phthalic anhydride | 6 | Excellent | 90 | 12 | 45 | 106 | 120 | 121 | 115 | 104 |
| J | Maleic anhydride | 6 | do | 60 | 23 | 94 | 115 | 112 | 97 | 74 | 62 |
| K | Dodecenylsuccinic anhydride | 6 | do | 45 | 7 | 21 | 34 | 35 | 36 | 41 | 44 |

[1] Parts stabilizer per 100 parts of polyvinyl chloride.

From the data in Table I it will be seen that the stabilized compositions of the present invention (Ex. No. A–E) had excellent heat stability, fair to excellent initial color, and good dimensional stability, whereas the composition containing a phthalic anhydride-melamine stabilizer (Ex. No. F) had poor dimensional stability, and compositions containing a single stabilizer component (Ex. No. G–K) had poor initial color, poor heat stability, and/or fair to poor dimensional stability.

What is claimed is:

1. A heat and light stable resinous composition comprising a vinyl halide resin, asbestos, and a stabilizer comprising (a) a nitrogen-containing compound selected from the group consisting of melamine, dicyandiamide, benzoguanamine, and mixtures thereof and (b) dodecenylsuccinic anhydride in the amount of approximately 0.1 part to 3 parts by weight of said anhydride per part by weight of said nitrogen-containing compound, said composition containing 50 parts to 200 parts by weight of asbestos and 0.5 part to 10 parts by weight of said stabilizer per 100 parts by weight of said vinyl halide resin.

2. A heat and light stable resinous composition comprising a vinyl halide resin, asbestos, and a stabilizer comprising (a) a nitrogen-containing compound selected from the group consisting of melamine, dicyandiamide, benzoguanamine, and mixtures thereof and (b) dodecenylsuccinic anhydride in the amount of approximately 0.1 part to 3 parts by weight of said anhydride per part by weight of said nitrogen-containing compound, said composition containing 80 parts to 150 parts by weight of asbestos and 1 part to 5 parts by weight of said stabilizer per 100 parts by weight of said vinyl halide resin.

3. A heat and light stable resinous composition in accordance with claim 2 wherein the nitrogen-containing compound is melamine.

4. A heat and light stable resinous composition in accordance with claim 2 wherein the nitrogen-containing compound is dicyandiamide.

5. A heat and light stable resinous composition in accordance with claim 2 wherein the nitrogen-containing compound is benzoguanamine.

6. A heat and light stable resinous composition comprising a vinyl halide resin, asbestos, and a stabilizer comprising (a) a nitrogen-containing compound selected from the group consisting of melamine, dicyandiamide, benzoguanamine, and mixtures thereof, (b) dodecenylsuccinic anhydride, and (c) a polyhydric alcohol having at least four hydroxyl groups in the amounts of 0.1 part to 3 parts by weight of said anhydride and 0.3 part to 2 parts by weight of said polyhydric alcohol per part by weight of said nitrogen-containing compound, said composition containing 80 parts to 150 parts by weight of asbestos and 1 part to 5 parts by weight of said stabilizer per 100 parts by weight of said vinyl halide resin.

References Cited
UNITED STATES PATENTS

| | | | |
|---|---|---|---|
| 2,394,417 | 2/1956 | Yngve | 260—30.6 |
| 3,084,135 | 3/1963 | Scullin | 260—41 |
| 3,180,848 | 3/1965 | Thompson | 260—41 |
| 3,194,785 | 7/1965 | Scullin | 260—41 |
| 3,210,317 | 10/1965 | Coldo | 260—45.8 |

JULIUS FROME, *Primary Examiner.*